Figure 1:
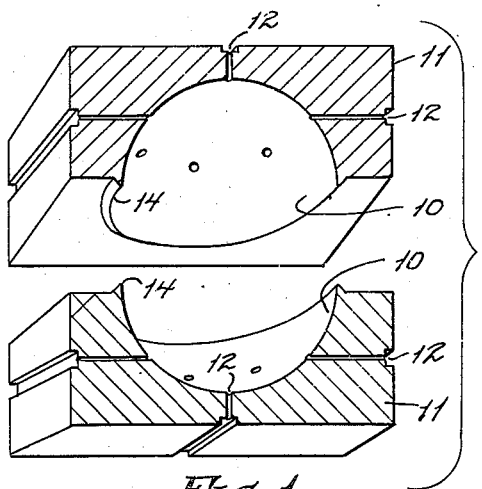

Sept. 1, 1942.  F. T. ROBERTS  2,294,424
HOLLOW ELASTIC BALL
Filed Sept. 2, 1938  4 Sheets-Sheet 1

INVENTOR.
BY Fred T. Roberts,
Bates, Golnick & Hearn
ATTORNEYS.

Sept. 1, 1942.   F. T. ROBERTS   2,294,424
HOLLOW ELASTIC BALL
Filed Sept. 2, 1938   4 Sheets-Sheet 2

INVENTOR.
Fred T. Roberts,
BY Bates, Golrick & Teare
ATTORNEYS.

Sept. 1, 1942.   F. T. ROBERTS   2,294,424
HOLLOW ELASTIC BALL
Filed Sept. 2, 1938   4 Sheets-Sheet 3

INVENTOR.
BY Fred T. Roberts,
ATTORNEYS.

Sept. 1, 1942.　　　F. T. ROBERTS　　　2,294,424
HOLLOW ELASTIC BALL
Filed Sept. 2, 1938　　　4 Sheets-Sheet 4

INVENTOR.
Fred T. Roberts,
BY Balis, Golrick & Team
ATTORNEYS.

Patented Sept. 1, 1942

2,294,424

UNITED STATES PATENT OFFICE 2,294,424

HOLLOW ELASTIC BALL

Fred T. Roberts, Los Angeles, Calif., assignor to Albert H. Bates, Shaker Heights, Ohio Application September 2, 1938, Serial No. 228,093

10 Claims. (Cl. 273—61)

This invention relates to hollow, elastic balls. The present application is a continuation in part of my copending application for Letters Patent, Serial No. 692,388, filed October 6, 1933. More particularly, the present invention contemplates the provision of a tennis or other comparatively light and flexible ball, constructed to react when struck with light blows, as distinguished from a golf ball, or similar hard, comparatively solid ball, which reacts only to heavy blows.

I am aware that in the past it has been proposed to produce a golf ball, which takes a hollow air-tight core, and wrapping around it linen or similar threads which are thereafter coated with rubber, to which some heavy material, such as litharge or metallic lead is applied. Moreover, it has been proposed to produce a golf ball by taking a small hollow core, of Celluloid, and wrapping around it a comparatively thick covering of thread, which might be of an elastic material, such as rubber strands, and then covering the whole with gutta percha exterior. It has also been proposed to manufacture golf balls by using a hollow, spherical core, which is surrounded by a substantially thick winding of an elastic thread or ribbon and is provided with concentric shells of Celluloid embedded in the winding to restrict the actions of the winding of the core and then covering the whole with a gutta percha covering.

In all of these constructions, the hollow central core has been of a comparatively small diameter, and is comparatively of unyielding form, while the layer of elastic wound thereon has been comparatively thick. The final casing has moreover been comparatively thick and only slightly yielding, so that in each case a ball having an external diameter of from two to four times the internal diameter of the hollow core has been produced.

In contradistinction to the golf balls above mentioned, the ball of the present invention is formed with a hollow central sphere of compounded rubber, having a comparatively large internal diameter and a comparatively thin wall, so as to be comparatively yielding, and this is surrounded by a comparatively thin layer of elastic winding and directly applied to the sphere and the whole is enclosed in a flexible cover. This produces a ball which may be readily distorted from its spherical shape, and thus accomplish the desired reaction. Such a ball is very resilient and capable of long life without material diminution of such resiliency.

The invention of this application is especially well adapted for tennis balls, which must be of a definite size, of a very light weight, and have a high degree of resiliency. Heretofore, the general custom has been to inflate tennis balls with air or gas under pressure. Experience has shown that the mere inflation of the ball does not produce a ball which will maintain its original internal pressure, and hence its resiliency, there being a gradual loss of such pressure and resiliency. This pressure loss, I believe, to a great extent, is due to the seepage of the air or gas through the wall of the rubber ball, probably owing to the fact that the pigments, powders or other substances which are mixed with the rubber to form the compound, from which the ball is formed, permit seepage of the air or gas through the wall of the ball or become saturated by such air or gas. Whatever the cause, it is a well known fact that tennis balls become less and less resilient until in a comparatively short time they cease to be satisfactory for use in the game.

In my prior application, heretofore mentioned, I proposed to eliminate substantially all of the internal fluid pressure by integrally forming ribs on the internal surface of the ball and winding such internally ribbed ball with stretched rubber strands to maintain the diameter uniform. While one purpose of such strands was to true up the ball and compress the ribs to give the ball the desired amount of resiliency without the use of a high degree of internal fluid pressure, nevertheless they compressed the wall of the ball for purposes hereinafter more fully set out. The claims of my copending application, heretofore mentioned, have been restricted to an internally ribbed ball, wrapped with stretched rubber strands to maintain those areas of the wall of the ball between the ribs in a true spherical shape.

The wrapping of the ribbed ball with rubber strands, as above mentioned, results in the normal diameter of the ball being decreased to such an extent that the normal fluid pressure within the ball is increased. I have found that this increased pressure is maintained over extended periods of time. I have also found that when a thin-walled ball of compounded rubber material, to make it comparatively stiff without ribs, is wrapped with an external winding of stretched rubber strands, reducing the diameter of the ball to increase the internal pressure and the resiliency of the ball, such increased pressure is also maintained over long periods of time. Likewise, I have found that when such a thin-walled rubber ball is filled with air or gas to increase its resiliency, its diameter is greater than its normal diameter, that is, its diameter is greater than the diameter of a similar ball having no internal pressure, and I have found that if I wrap such a gas or air-filled ball with stretched rubber strands to decrease its diameter to a diameter substantially equal to or less than its normal diameter, the pressure within the ball is maintained over extended periods of time.

From the above it will be seen that I may provide an improved tennis ball, the life of which is materially longer than the life of the tennis balls of the past, by wrapping a thin-walled rubber or elastic sphere with a sufficiently resisting wall, whether provided with internal ribs or not, as desired, with a thin winding of stretched rubber strands applied directly to the exterior of the sphere to decrease the diameter thereof and increase the internal fluid pressure and therefore the resiliency of the ball, whether or not the pressure in such ball was greater than normal atmospheric pressure before the ball was wound with the elastic strands.

I believe that the retention of the pressure in my improved ball over prolonged periods of time is due to the compression of the material forming the wall of the central sphere. In the case of balls which are filled with air or gas under pressure, I believe that by winding such balls with stretched rubber strands applied directly thereto I not only eliminate the tension set up in the wall of the ball by the internal pressure, but I place such wall in compression in entirety. By placing the wall of the ball in such compression, I greatly compact the compound, filling up any minute pores therein and bringing the pigments, powders and minerals in the compound into a closer mechanical association with the rubber and binding or bonding materials in the compound, and thus eliminate the seepage into or through the wall of the ball.

The main object of the invention of the present application, as has been outlined in the preceding paragraphs, is to provide an improved flexible thin-walled ball, especially adapted for use in tennis or similar games, and which ball, when so used, will be capable of long life without diminution of its resiliency. The invention, however, has other and more specific objects, as, for instance, the provision of a ball in which the different portions of the stretched elastic bands are attached to each other and to the cover, which not only eliminates the deterioration of the strands by adhesive or cement, but which, consequent upon a slight rupture of the cover, will prevent the strands from increasing the rupture; and the provision of a ball in which the strands are protected to enable the ball to be handled during the application of the cover without danger of damaging such strands.

Other objects of the invention will become more apparent from the following description, which refers to the accompanying drawings illustrating the ball in various stages of manufacture. The essential features of the invention will be summarized in the claims.

Figure 1A:
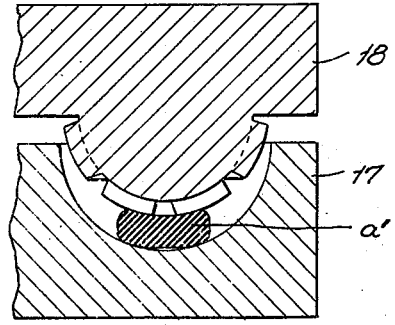
Figure 2:
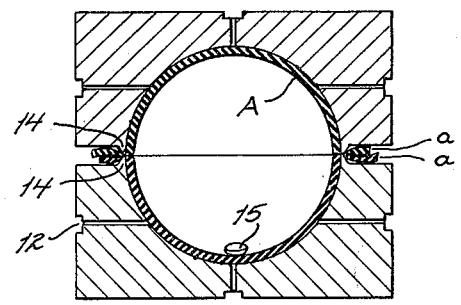
Figure 2A:
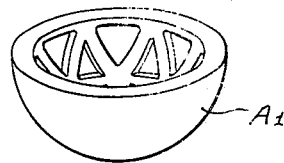
Figure 3:
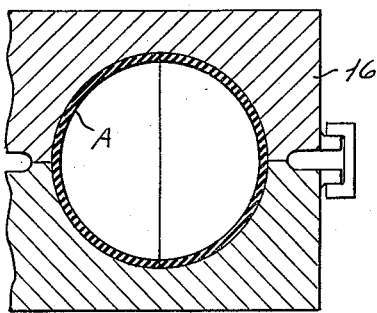
Figure 3A:
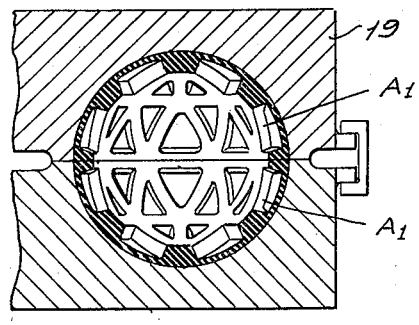
Figure 4:
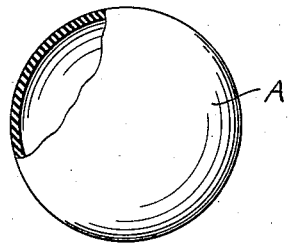
Figure 5:
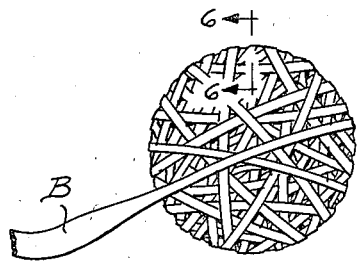
Figure 6:
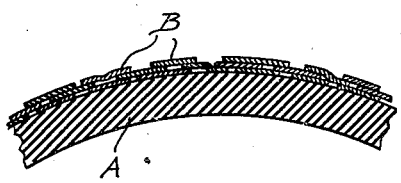
Figure 7:
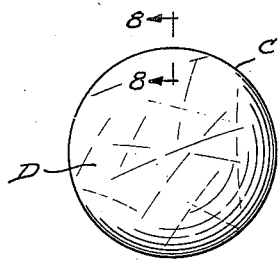
Figure 8:
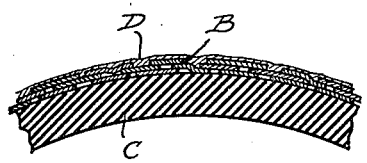
Figure 9:
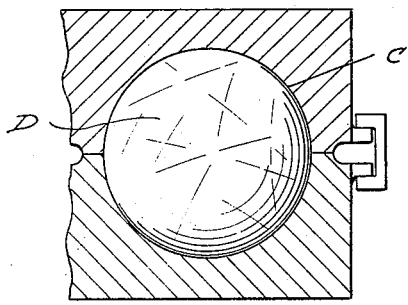
Figure 10:
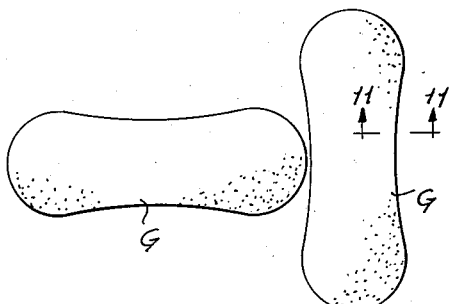
Figure 11:
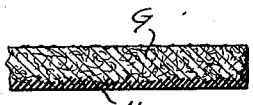
Figure 12:
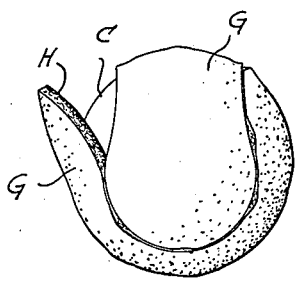
Figure 13:
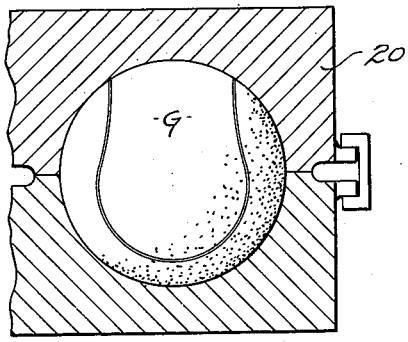
Figure 14:
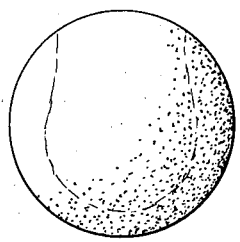
Figure 16:
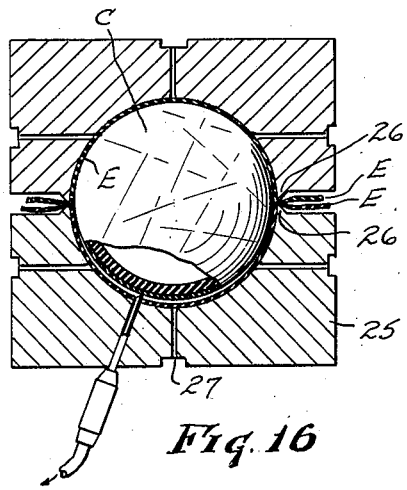
Figure 15:
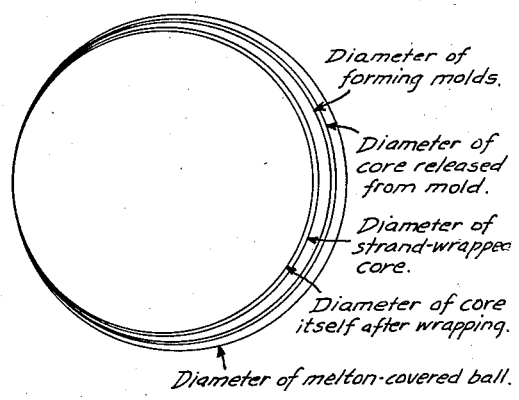
Figure 17:
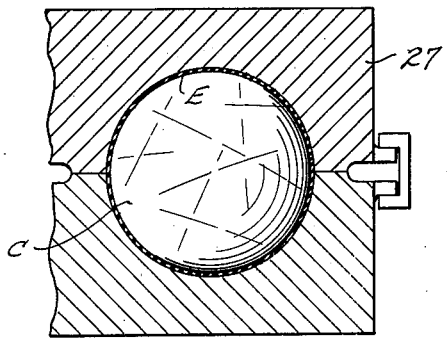
Figure 19:
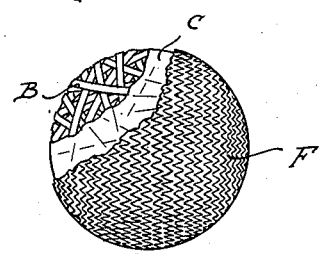
Figure 18:
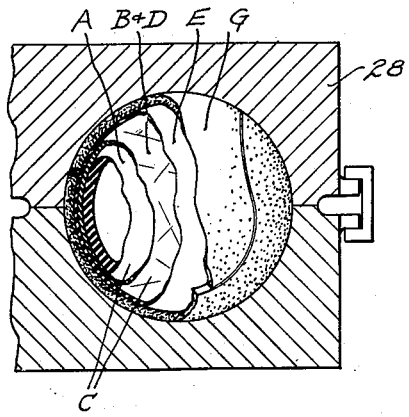
Figure 20:
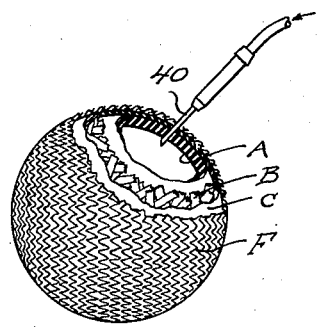

In the drawings, Figs. 1, 2 and 3 illustrate steps in one method of making the original hollow sphere shown in Fig. 4; Figs. 1a, 2a and 3a illustrate steps in making the hollow sphere of Fig. 4a; Fig. 5 illustrates the step of winding the rubber strands on the original sphere of Figs. 4 or 4a; Fig. 6 is an enlarged fragmentary section of the article shown in Fig. 5; Fig. 7 illustrates the wound sphere of Fig. 5 after it has been dipped or coated with latex; Fig. 8 is an enlarged section on the line 8—8 of Fig. 7; Fig. 9 is a view illustrating the step of vulcanizing the wound and latex-covered ball; Fig. 10 illustrates the cover of melton or felt; Fig. 11 is an enlarged fragmentary section taken along the line 11—11 of Fig. 10, illustrating the melton, as provided with a coating or adhering layer of rubber or adhesive; Fig. 12 illustrates the step of applying the melton cover to the wound and latexed ball; Fig. 13 illustrates the step of vulcanizing the covered ball; Fig. 14 is a view of the completed ball; Fig. 15 is a diagram illustrating the varying diameters of the ball at different stages in its manufacture; Fig. 16 illustrates the applying of a rubber covering to the wound and latexed ball, prior to the application of the melton cover; Fig. 17 illustrates the step of vulcanizing the ball produced by Fig. 16; Fig. 18 illustrates the vulcanizing of the ball as completed, having the intermediate rubber sheet between the latex covered bands and the melton; Fig. 19 illustrates a wound ball, for instance the wound and latexed ball of Fig. 7, enclosed by a woven or knitted cover; Fig. 20 illustrates the step of increasing the internal pressure in the ball of Fig. 19.

In carrying out the present invention I first make a hollow rubber sphere, having a comparatively large internal diameter and a comparatively thin wall. As heretofore mentioned, the sphere may, if desired, have an internal fluid pressure greater than atmospheric pressure. Likewise, the sphere may be provided with internal reinforcing ribs.

When an ordinary sphere is used, it may be made by any well known method. However, I prefer to make such sphere by the vacuum seating method, as illustrated, for instance, in my prior Patent No. 1,346,848, and reference to such patent may be had for a more complete disclosure of the method of making such sphere. Briefly, however, in this method a sheet of raw rubber a, compounded with stiffening fillers, is placed across a mold cavity 10 of each of a pair of coacting mold members, such as those indicated herein at 11, in Fig. 1. These rubber sheets are then drawn into the respective mold cavities by a vacuum, which is applied through suitable passages 12 in the molds. The molds are then brought into mutual registration with the sheets between them, as shown in Fig. 2. The sheets are joined together by pressure between the two mold members and the edges of the sheets are trimmed at each side of the mold cavity by raised cutting edges 14, which form the rims of such cavities. Thus, the sheets are caused to take the shape of an approximate sphere A.

If the ball is to have an internal pressure greater than normal atmospheric pressure, I may place a small quantity of heat expansible substance 15, adapted to form a permanent gas in one of the hemispherical parts, prior to the bringing of the two mold parts together. If desired, I may employ for this purpose the mixture of ammonium chloride and sodium nitrite, as recommended in my Patent No. 1,575,388. Such a mixture, when moist and heated, reacts to generate nitrogen, according to formula $NH_4Cl + NaNO_2 = NaCl + 2H_2O + 2N$.

After the biscuit has been formed, it is removed from the forming mold 10 and placed in a vulcanizing mold 16, where it is cured sufficiently to cause a permanent set in the rubber and produce a perfect sphere.

If an internally ribbed or braced sphere is to be used, I may use the sphere shown in my prior Patent 1,964,008. This ribbed sphere may be formed by placing portions of rubber a' between a pair of coacting mold members, such as those shown at 17 and 18 in Fig. 1a, and bringing such mold members together, pressing the rubber into the form of a hemisphere, such as that shown at A1, in Fig. 2a. This hemisphere may be provided with ribs on either its exterior or interior wall, as desired. If the ribs are on the interior wall, as indicated by the hemisphere shown in Fig. 2a, two of these spheres are brought together in a vulcanizing mold, such as that shown at 19 in Fig. 3A, and cured sufficiently to cause a permanent set in the rubber. However, if the ribs are on the external surfaces of the hemispheres, the latter are first turned inside out, and then placed in the vulcanizing mold and partially cured, as heretofore explained.

Figure 4A:
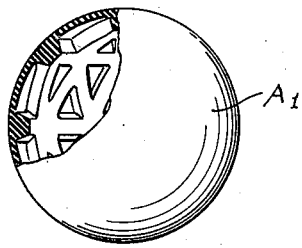

Spherical balls, made as above described, are illustrated in Figs. 4 and 4a, Fig. 4 illustrating a plain or ordinary ball, and Fig. 4a illustrating an internally ribbed ball. However, it is to be understood that I do not limit this invention to the use of any specific spheres, as long as such sphere is relatively light in weight; is hollow; has a relatively large internal diameter and a relatively thin wall; is resilient; and is of material sufficiently stiff to form a base for the winding.

As heretofore mentioned, I have found that by decreasing the diameter of a sphere, such as either of those shown in Figs. 4 or 4a, I compact the structure of the wall thereof and cause such wall to become impervious to the passage of fluid, such as air or gas, from the interior to the exterior of the ball, and thus I am able to provide a ball which may be used over prolonged periods of time without diminution of the internal pressure or resiliency.

To decrease the diameter of the ball or sphere I form directly on the sphere a thin winding or covering of comparatively narrow rubber bands or strands B, as indicated in Figs. 5 and 6. These strands are of vulcanized rubber, stretched almost to their elastic limit. By so wrapping the sphere A, I decrease the external diameter of the sphere to such an extent that the diameter of the wound sphere is substantially no greater than the diameter of the original sphere, and in case of a fluid or gas-filled sphere, the diameter of the wound sphere is no greater or is less than the diameter of the molds in which it was made. For instance, I find that a plain sphere, formed and cured in molds having cavities 2⅜ inches in diameter, when inflated by the action of heat applied during the curing on pressure-producing substance 15, will expand when removed from the vulcanizing mold and have an outside diameter of about 2½ inches. The outside diameter of this sphere, when wrapped with rubber strands under tension, including the wrapping, will be approximately 2⅜ inches. As the thickness of the layer of rubber strands required to so reduce the diameter of the sphere is approximately 1/64 of an inch, the diameter of the sphere itself, not including the wrapping, will be about 1/32 of an inch smaller than the diameter of the forming and vulcanizing mold, in which the original rubber sphere was made.

In order to stiffen the hollow sphere for the purpose of resisting the application of the strands, I may freeze the sphere, as for instance by imbedding it in solid carbon dioxide, and then wind it with the stretched strands while the sphere is in frozen condition. Such freezing contracts the sphere and reduces the internal pressure; then, after the strands are applied, the thawing of the sphere increases the pressure while the strands hold the thawed sphere to the frozen size.

If desired, the wrapped sphere may be covered immediately with the usual melton covering, using any desirable adhesive, and then subjected to a final vulcanization, to provide a finished product. However, I find it desirable to bind the rubber strands together and also to protect them from any possible deterioration that might be caused if an adhesive is used in applying the covering. I prefer to protect the winding of stretched rubber strands by dipping the ball in latex. Such a ball is shown at C in Figs. 7 and 8, as having a latex coating or filler D. I then permit the latex to dry and apply the melton covering. This coating of latex serves to substantially fill up the spaces between the rubber strands, thereby producing a truer sphere, binding the strands to each other, and protecting the strands from deleterious action by the cement, if the same is used to secure the cover. It also serves to prevent the tension of the strands from being transmitted to the cover, thereby producing a ball, the strands of which, if the cover has been accidentally ruptured, will not tend to increase such rupture.

I further find that if the sphere is vulcanized or subjected to another partial curing to again establish a set in the ball subsequent to the application of the latex covering, and prior to the application of the final melton covering, the ball will be trued up, thus providing greater assurance that the resulting ball will be round. Hence, where the ball, after being covered with latex, is found to be slightly out of round, I may utilize such intermediate vulcanizing or partial curing to true up or bring the ball to shape. This is indicated in Fig. 9. This recuring hardens the latex, and provides a stronger surface to which the final covering may be vulcanized. This intermediate curing or vulcanization further increases the bond between the latex and the strands, thereby increasing the action of the latex in preventing the tensioned rubber strands from increasing an inadvertent rupture of the final covering.

A melton cover for the ball is best shown in Fig. 10. As there shown, it comprises two pieces of melton G, which are wrapped around the wound and latex-covered ball, as indicated in Fig. 12. The latex-covered sphere may be covered with a coating of suitable adhesive or cement prior to the application of the cover, to secure the same to the ball, or, as shown in Fig. 11, a coating of cement H or thin layer of raw rubber may be spread on the inner surfaces of the melton cover and then pressed into contact with the latex-covered ball, and, as indicated in Fig. 12. Thereafter, the melton-covered ball is placed in a curing mold 20 and given its final vulcanization, thereby providing the ball, as shown in Fig. 14.

When using certain types of materials in the rubber compound or in the melton covering, or when it is desired to produce a ball having a rubber cover, as distinguished from the melton cover, I may cover the latex-coated wrapped sphere with a rubber cover. This is preferably accomplished by placing a sheet E of raw rubber in mold member 25, Fig. 16, which has cutting edges 26, and vacuum passages 27, similar to those described in connection with the mold members 11 of Fig. 1. These rubber sheets are stretched across the mold cavities, and a vacuum applied, drawing the sheets into the cavities. The latex-coated wrapped sphere C of Fig. 7 is then placed in the cavity of the lower mold member 25, the two mold members brought together, causing the sphere to be enclosed in a rubber cover.

To prevent the accumulation of air between the latex cover and rubber cover, I may provide at least one of the mold members 25 with a needle, which penetrates the rubber sheet, but which will not penetrate the layer of rubber strands of the sphere C. I then apply a vacuum through this needle, to withdraw any air which might be trapped between the sphere and the rubber cover. I then remove the rubber-covered sphere from the mold 25 and place it in a vulcanizing mold 26, Fig. 7, provided with cavities, and vulcanize the ball.

If the final product is to have a melton or other covering, I partially complete the vulcanization in the mold 26 and remove the rubber-covered sphere from such mold and apply the usual melton or other covering, as heretofore explained, and again place the ball in a vulcanizing mold, shown at 27 in Fig. 18, and complete the vulcanization of the ball.

In some instances it is desired to provide a ball having a cover which is woven in place on the ball, as for playing squash tennis. In this case, I inflate the ball after the cover has been woven thereon, to insure a very tight fit between the cover and the ball. I have found that the latex-covered wrapped ball C, of Fig. 7, is well adapted for such use. When such a ball is desirable, I use the sphere C shown in Fig. 7, and weave or knit a covering F in place on the ball, as indicated in Fig. 19, and then insert a needle 40 through the walls of the sphere at any point and increase the pressure, as desired, and withdraw the needle.

I have found that when this ball is inflated after it has been covered as described, the compression set up in the walls of the ball by the wrapping of rubber strands is sufficiently great to entirely close the opening made by the pressure needle 40, and thus prevent future diminution of the pressure. The pressure needle 40 may be inserted at any point in the wall of the ball and does not require the addition of a sealing plug or other device, as has been generally carried by the internal wall of the ball. Such plug has the disadvantage of requiring the ball to be inflated at a predetermined point, as well as producing a ball which is to a slight extent, at least, lopsided; that is, heavy at the point where such sealing plug is attached to the structure of the ball.

From the foregoing description it will be seen that I have provided an improved ball, having a comparatively large internal diameter and comparatively thin wall, which ball may have an internal pressure greater than atmospheric pressure, and will maintain such pressure over prolonged periods of time, thereby maintaining the resiliency of the ball and hence its usefulness. I have accomplished this by decreasing the diameter of the original sphere which forms the ball, by the use of stretched rubber strands, wound directly on such sphere. It will further be seen that I have provided a ball, wherein the strands are bound in place and protected from adhesive or cement used in holding the covering on the ball, and wherein an injury to the cover, even if it passes to the strands, will not destroy the ball.

Reference is made to my divisional application Serial No. 273,865, filed May 16, 1939, for claims on the method herein illustrated and described.

I claim:

1. A hollow rubber ball of the type that can be indented appreciably by hand, comprising a closed hollow resilient sphere, having a comparatively thin wall and a comparatively great internal diameter, and a layer of thin stretched elastic strands entirely covering the sphere, said layer being no greater in thickness than the thickness of the wall of said sphere.

2. A hollow rubber ball, having a wall which is thin in comparison to the diameter of its cavity, such diameter being at least ten times as great as the wall thickness, and having a thin exterior layer of a wrapping of thin stretched rubber strands wound on said wall.

3. A tennis or like ball, comprising a closed, hollow sphere of vulcanized rubber, with a comparatively great internal diameter and a comparatively thin wall, a winding directly upon the exterior of such sphere of stretched rubber strands, said winding placing the wall of the ball in compression to render such wall pneumatically tight, and a fibrous covering embracing the wound ball.

4. A tennis or like ball which may be appreciably indented by hand, having a hollow rubber sphere of comparatively thin wall and comparatively great internal diameter, a surrounding layer of stretched rubber strands compressing the sphere, and an enclosing felt cover adhering to the strands by vulcanized adhesive.

5. A tennis or like ball, comprising a closed hollow sphere of rubber, with a comparatively great internal diameter and a comparatively thin wall, having a winding of stretched rubber strands upon the exterior of the sphere, thereby compressing the wall of the sphere, whereby such wall is made impervious to the passage of fluid pressure from within the ball to the exterior of the ball, a coating of latex in the interstices between the strands, and a cover secured to said strands.

6. A tennis or like ball, comprising a closed hollow sphere of rubber, with a comparatively great internal diameter and a comparatively thin wall and having an internal fluid pressure above atmospheric, having a winding of stretched, comparatively narrow, elastic strands directly upon the exterior of the sphere, whereby such wall is made impervious to the passage of fluid pressure from within the ball to the exterior of the ball, a coating of latex in the interstices between the strands, and a melton cover vulcanized to said latex-coated strands.

7. A tennis or like ball, comprising a closed hollow sphere of rubber, with a comparatively great internal diameter and a comparatively thin wall, having a winding of stretched rubber strands upon the exterior of the sphere, thereby compressing the wall of the sphere, whereby such wall is made impervious to the passage of fluid pressure from within the ball to the exterior of the ball, a latex coating in the voids between strands, a rubber cover secured to said coating, and a fibrous cover embracing the rubber covered ball.

8. A tennis or like ball, comprising a closed hollow sphere of rubber, with a comparatively great internal diameter and a comparatively thin wall, having a winding of stretched rubber strands upon the exterior of the sphere, thereby compressing the wall of the sphere, a layer of rubber binding on said strands and a woven fabric cover embracing said rubber layer and secured thereto by cement vulcanized to the cover and to the winding.

9. A hollow rubber ball having a comparatively thin composite wall of layers of different rubber compounds and a fibrous casing vulcanized to the outer layer, one of the layers of rubber under greater elastic tension than the other layers and constricting them and the fibrous casing.

10. A hollow rubber ball, comprising a central sphere having an exterior wrapping of thin rubber bands applied thereto, a coating of adhesive outside of said wrapping and in the open spaces between the wrappings and the uncovered surface of the central sphere and joined by vulcanization to a fibrous cover outside said adhesive coating.

FRED T. ROBERTS.